US008094208B2

(12) United States Patent
Myhrvold

(10) Patent No.: US 8,094,208 B2
(45) Date of Patent: Jan. 10, 2012

(54) COLOR FILTERS AND DEMOSAICING TECHNIQUES FOR DIGITAL IMAGING

(75) Inventor: Nathan P. Myhrvold, Bellevue, WA (US)

(73) Assignee: The Invention Scienne Fund I, LLC

(*) Notice: Subject to any disclaimer, the term of this patent is extended or adjusted under 35 U.S.C. 154(b) by 273 days.

(21) Appl. No.: 12/653,172

(22) Filed: Dec. 8, 2009

(65) Prior Publication Data

US 2011/0013054 A1 Jan. 20, 2011

Related U.S. Application Data

(62) Division of application No. 12/590,041, filed on Oct. 30, 2009.

(60) Provisional application No. 61/271,195, filed on Jul. 17, 2009.

(51) Int. Cl.
*H04N 5/228* (2006.01)

(52) U.S. Cl. .................... 348/222.1; 348/273; 348/279; 348/280

(58) Field of Classification Search .................. 348/273, 348/274, 279, 280
See application file for complete search history.

(56) References Cited

U.S. PATENT DOCUMENTS 5,159,650 A * 10/1992 Nishiwaki et al. .............. 385/37
6,025,213 A * 2/2000 Nemoto et al. ............... 438/122
2002/0097492 A1* 7/2002 Cobb et al. .................... 359/577
2004/0032517 A1 2/2004 Walmsley et al.
2004/0095531 A1 5/2004 Jiang et al.
2004/0263994 A1 12/2004 Sayag
2007/0145273 A1 6/2007 Chang
2008/0137215 A1* 6/2008 Nurishi ......................... 359/698
2009/0174638 A1 7/2009 Elliott et al.

OTHER PUBLICATIONS

"Tutorials: Diffraction & Photography"; Diffraction Limited Photography: Pixel Size, Aperture and Airy Disks; printed on Oct. 29, 2009; pp. 1-5; located at: http://www.cambridgeincolour.com/tutorials/diffraction-photography.htm.

PCT International Search Report; International App. No. PCT/US 10/02018; Nov. 10, 2010; pp. 1-4.

* cited by examiner

*Primary Examiner* — Yogesh Aggarwal

(57) ABSTRACT

Color filter arrays or mosaics are provided for imaging a scene with diffraction limited optics. A distribution of color types in a color filter array is biased toward smaller wavelengths to avoid or reduce loss of spatial resolution information at higher wavelengths due to a larger extent of diffraction at the higher wavelengths. Demosaicing methods for reconstructing a partial or full color image from raw image data involve applying correction factors to account for diffraction. The correction factors are based on pixel size and/or a measure of the extent of diffraction (e.g., an Airy disk diameter) for each wavelength in the color filter array.

32 Claims, 10 Drawing Sheets

Method 800

810
Provide an array of N pixels (or pixel data set) having light intensity values of a scene sampled by an imaging device having an f-stop (f), wherein a first sub array of N1 pixels in the array of N pixels has light intensity sample values corresponding to a first spectral wavelength $\lambda_1$ 820
Modify the array of N pixels by modifying the light intensity sample values in one or more of the N1 pixels in the first sub array as a function of an Airy disk diameter 1.22*f* λ associated with light diffraction by the imaging device at wavelength λ

830
Outputting the modified array of N pixels as an image representation of a scene

100

| G | R | G | R | G | R |
|---|---|---|---|---|---|
| B | G | R | G | B | G |
| G | R | G | R | G | R |
| R | G | B | G | R | G |
| G | R | G | R | G | R |
| B | G | R | G | B | G |

| B | R | B | G |
|---|---|---|---|
| G | B | R | B |
| B | G | B | R |
| R | B | G | B |

| B | R |
|---|---|
| G | B |

2 x 2 array with 2 B pixels, 1 R pixel, 1 G pixel

| B | R | B |
|---|---|---|
| G | B | R |
| B | G | B |

3 x 3 array with 5 B pixels, 2 R pixels, 2 G pixels

Figures 3C, 3D, 3E, 3F:
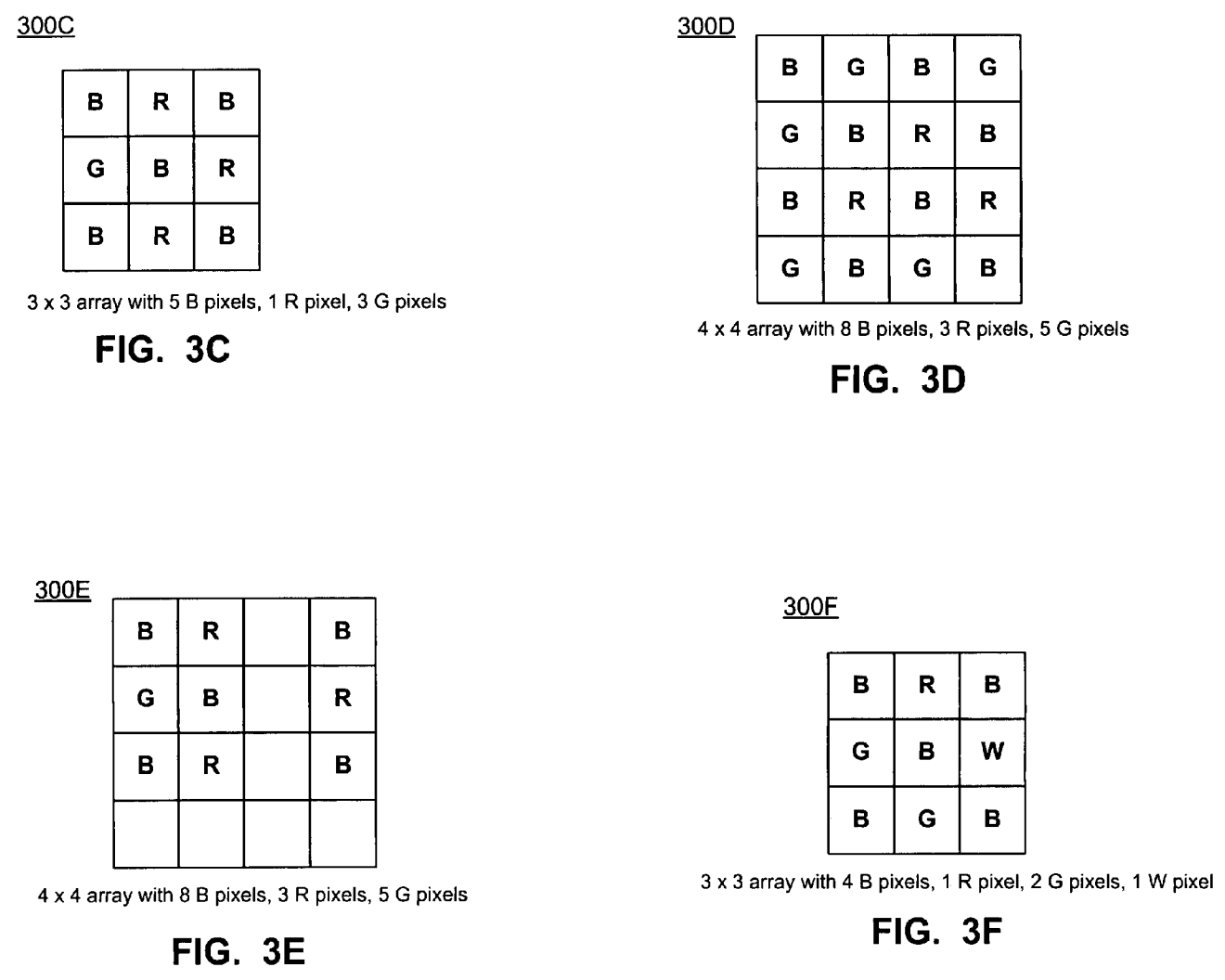

| B | R | B |
|---|---|---|
| G | B | R |
| B | R | B |

3 x 3 array with 5 B pixels, 1 R pixel, 3 G pixels

| B | G | B | G |
|---|---|---|---|
| G | B | R | B |
| B | R | B | R |
| G | B | G | B |

4 x 4 array with 8 B pixels, 3 R pixels, 5 G pixels

| B | R | | B |
|---|---|---|---|
| G | B | | R |
| B | R | | B |
| | | | |

4 x 4 array with 8 B pixels, 3 R pixels, 5 G pixels

| B | R | B |
|---|---|---|
| G | B | W |
| B | G | B |

3 x 3 array with 4 B pixels, 1 R pixel, 2 G pixels, 1 W pixel

| | | | |
|---|---|---|---|
| B | R | B | G |
| G | B | W | B |
| B | G | B | R |
| W | B | G | B |

4 x 4 array with 8 B pixels, 2 R pixels, 4 G pixels, 2 W pixels

| | | | | |
|---|---|---|---|---|
| B | R | B | G | B |
| G | B | W | B | G |
| B | R | B | G | B |
| G | B | W | B | G |
| B | R | B | G | B |

5 x 5 array with 13 B pixels, 4 R pixels, 6 G pixels, 2 W pixels

FIG. 3H

400
Light From Scene
180
Imaging Optics Aperture 430
Diffracted light
Color filter 420
Sensor pixel 410a
Single chip-image sensor 410
Filter element 420a

FIG. 6

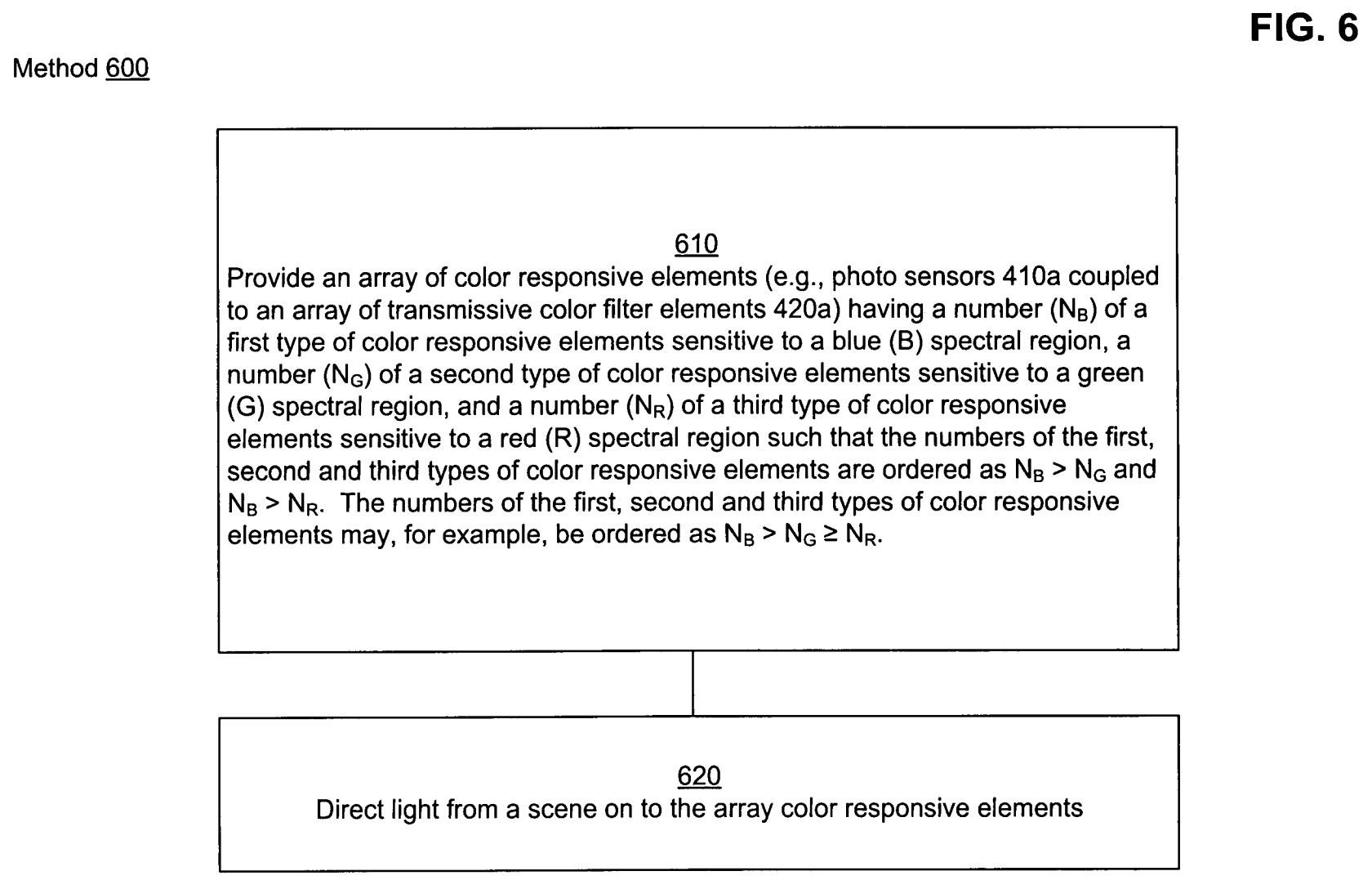

Method 600

610
Provide an array of color responsive elements (e.g., photo sensors 410a coupled to an array of transmissive color filter elements 420a) having a number ($N_B$) of a first type of color responsive elements sensitive to a blue (B) spectral region, a number ($N_G$) of a second type of color responsive elements sensitive to a green (G) spectral region, and a number ($N_R$) of a third type of color responsive elements sensitive to a red (R) spectral region such that the numbers of the first, second and third types of color responsive elements are ordered as $N_B > N_G$ and $N_B > N_R$. The numbers of the first, second and third types of color responsive elements may, for example, be ordered as $N_B > N_G \geq N_R$.

620
Direct light from a scene on to the array color responsive elements

FIG. 9

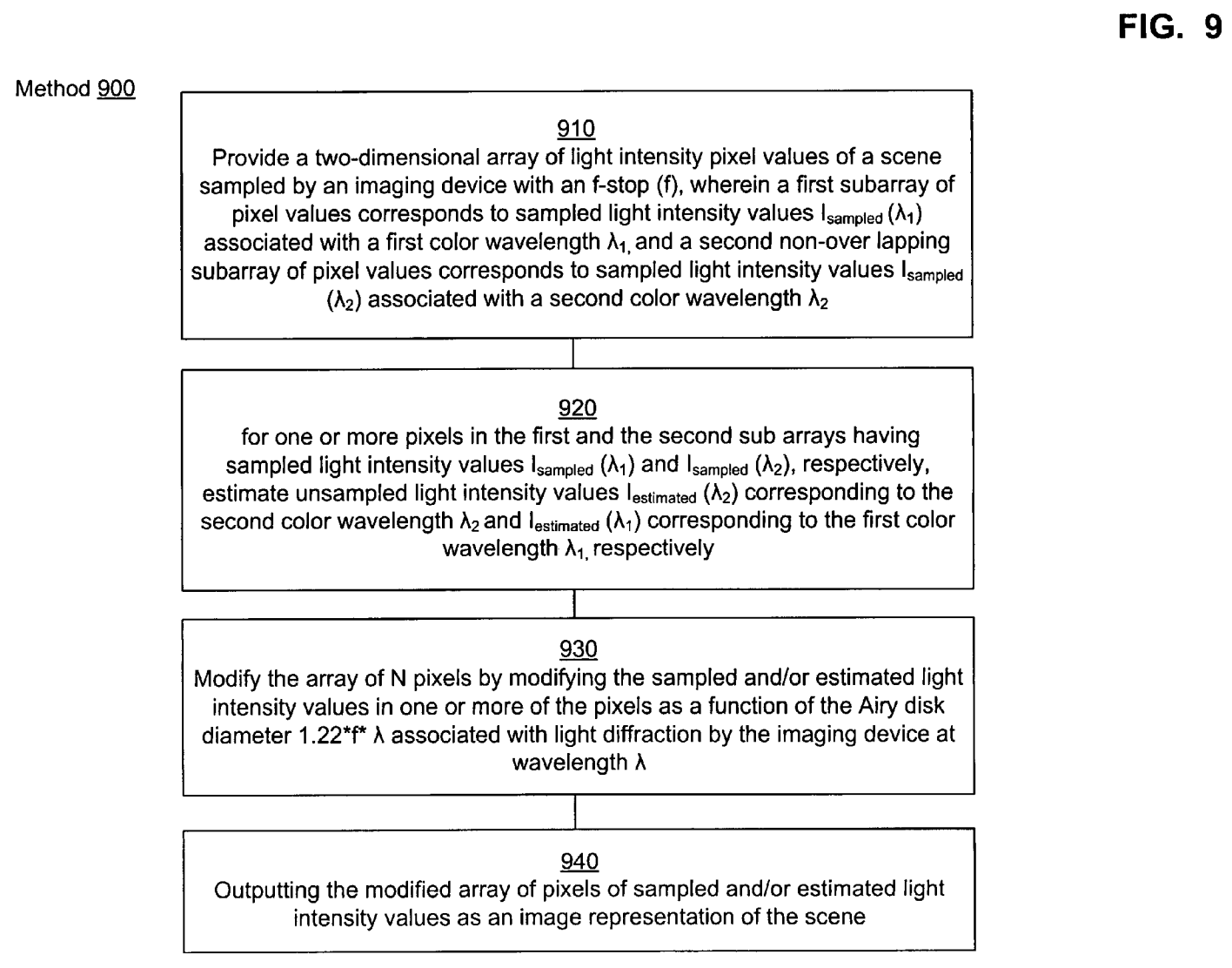

Method 900

910
Provide a two-dimensional array of light intensity pixel values of a scene sampled by an imaging device with an f-stop (f), wherein a first subarray of pixel values corresponds to sampled light intensity values $I_{sampled}(\lambda_1)$ associated with a first color wavelength $\lambda_1$, and a second non-over lapping subarray of pixel values corresponds to sampled light intensity values $I_{sampled}(\lambda_2)$ associated with a second color wavelength $\lambda_2$ 920
for one or more pixels in the first and the second sub arrays having sampled light intensity values $I_{sampled}(\lambda_1)$ and $I_{sampled}(\lambda_2)$, respectively, estimate unsampled light intensity values $I_{estimated}(\lambda_2)$ corresponding to the second color wavelength $\lambda_2$ and $I_{estimated}(\lambda_1)$ corresponding to the first color wavelength $\lambda_1$, respectively 930
Modify the array of N pixels by modifying the sampled and/or estimated light intensity values in one or more of the pixels as a function of the Airy disk diameter $1.22*f*\lambda$ associated with light diffraction by the imaging device at wavelength $\lambda$ 940
Outputting the modified array of pixels of sampled and/or estimated light intensity values as an image representation of the scene

FIG. 10

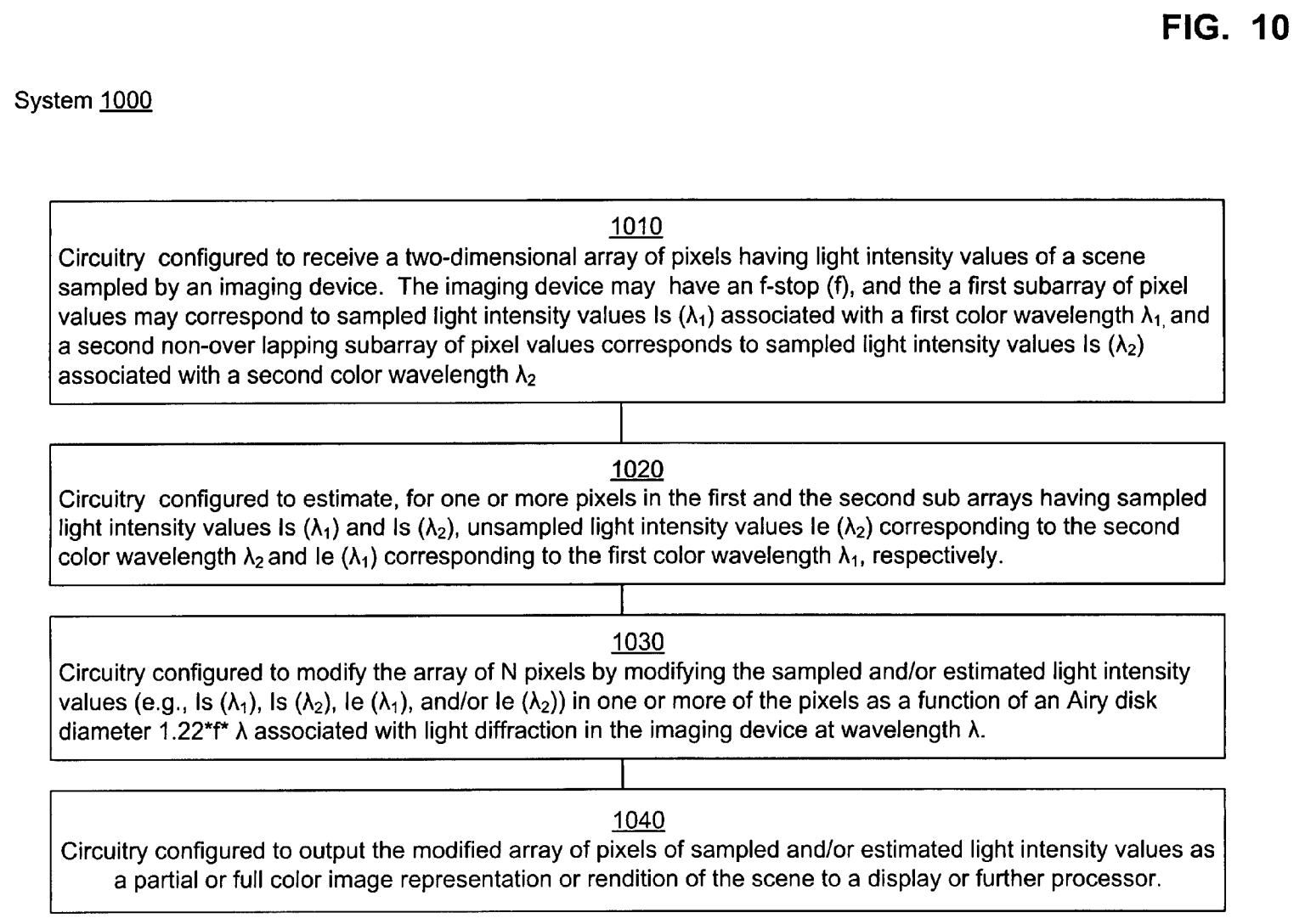

System 1000

1010
Circuitry configured to receive a two-dimensional array of pixels having light intensity values of a scene sampled by an imaging device. The imaging device may have an f-stop (f), and the a first subarray of pixel values may correspond to sampled light intensity values Is ($\lambda_1$) associated with a first color wavelength $\lambda_1$, and a second non-over lapping subarray of pixel values corresponds to sampled light intensity values Is ($\lambda_2$) associated with a second color wavelength $\lambda_2$ 1020
Circuitry configured to estimate, for one or more pixels in the first and the second sub arrays having sampled light intensity values Is ($\lambda_1$) and Is ($\lambda_2$), unsampled light intensity values Ie ($\lambda_2$) corresponding to the second color wavelength $\lambda_2$ and Ie ($\lambda_1$) corresponding to the first color wavelength $\lambda_1$, respectively.

1030
Circuitry configured to modify the array of N pixels by modifying the sampled and/or estimated light intensity values (e.g., Is ($\lambda_1$), Is ($\lambda_2$), Ie ($\lambda_1$), and/or Ie ($\lambda_2$)) in one or more of the pixels as a function of an Airy disk diameter 1.22*f* $\lambda$ associated with light diffraction in the imaging device at wavelength $\lambda$.

1040
Circuitry configured to output the modified array of pixels of sampled and/or estimated light intensity values as a partial or full color image representation or rendition of the scene to a display or further processor.

COLOR FILTERS AND DEMOSAICING TECHNIQUES FOR DIGITAL IMAGING

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a divisional of U.S. patent application No. 12/590,041, entitled COLOR FILTERS AND DEMOSAICING TECHNIQUES FOR DIGITAL IMAGING, naming Nathan P. Myhrvold as the inventor, filed 30 Oct. 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

TECHNICAL FIELD

The present application relates, in general, to color imaging technology. In particular, the application relates to the spectral content of images.

BACKGROUND

Color is a psychological phenomenon based on the interaction of the spectrum of light (distribution of light energy versus wavelength) with light receptors in the eye, which have specific sensitivities for specific spectral wavelength bands or regions (hereinafter "spectral components") of light. Color categories and physical specifications of color are also associated with objects, materials, light sources, etc., based on their physical properties such as light absorption, reflection, or emission spectra.

In the physical sense, a color is the ratio of intensities measured in different spectral components of the electromagnetic spectrum. In the physiological sense, in humans, the different spectral components are defined by the spectral sensitivity curves of three different types of receptors in the eye (i.e., the so-called red, blue, and green cones). The human brain processes and combines signals from the red, blue and green cones to create a composite impression or image of a scene. All colors in the scene are perceived as combinations of the red, blue and green cone signals. The range or gamut of colors that are perceived by humans is represented, for example, by the CIE 1931 chromaticity diagram.

Man-made color image sensors (e.g., color film, or digital cameras using CCD or CMOS sensors) also sense light intensities in a finite number of distinct spectral components. Various types of color image sensors differ in how they separate and measure the distinct spectral components. For example, a color film may have a stack of three different emulsion layers that are exposed by red, green, and blue components of light, respectively. A digital camera may use an array of layered sensors so that every pixel, like a color film, contains a stack of sensors sensitive to individual colors (e.g., sensors available under the Foveon trademark). More commonly, digital cameras or other man-made color image sensor arrangements use a spatial color filter array (e.g., a Bayer color filter array) positioned on top of a CMOS or CCD sensor to capture different spectral components of light in corresponding nominal pixel types.

The man-made color image sensor arrangements sense and collect intensity data for each distinct spectral component received from a scene. The data for each spectral component is monochrome, i.e., it includes only intensity information, but no color information. To create an approximate color image or rendition of a scene, the different intensity data for the distinct spectral components are processed, encoded to certain colors and intensities, and combined.

A three-color Bayer color filter array is used in most single-chip digital image sensors (in digital cameras, camcorders, and scanners) to create a color image. A Bayer filter mosaic is a color filter array for arranging red (R), green (G), blue (B) color filters on a square grid of photosensors. The filter pattern is typically 50% green, 25% red and 25% blue. FIG. 1, which is adapted from Bayer U.S. Pat. No. 3,971,065, shows another exemplary Bayer filter mosaic pattern with red, blue and green color transmissive filters arranged in a repeating pattern. In this pattern, luminance elements (green, denoted by a "G") assume every other array position. Chromacity elements (red, denoted by an "R") alternate with the G luminance elements in alternate rows. The R elements also alternate with other chromacity elements (blue, denoted by a "B") in filling the remaining array positions.

The Bayer filter mosaic patterns are designed to mimic the human eye's greater resolving power with green light. For example, in the Bayer color filter array shown in FIG. 1, B elements contribute only one-eighth of the element population in recognition of the human visual system's relatively limited ability to discern blue detail. Red detail, to which the human visual system is more responsive, is sampled at a higher rate than for blue detail by virtue of the relatively greater population of the R elements. Luminance detail, to which the human eye is most responsive, is sampled at the highest rate by the large population of G elements in the array.

The raw output of a Bayer-filter image sensor may be referred to as a Bayer pattern image. Since each pixel of the image sensor is filtered to record only one of three colors, the data from each pixel does not fully determine color on its own. To obtain a full-color image, various demosaicing algorithms can be used to interpolate a set of complete red, green, and blue values for each pixel of the image sensor.

Other types of three- and four-color filter arrays suggested for use with man-made color image sensors are also based on luminance-chrominance considerations to mimic the human eye's perception of color. (See e.g., Roddy et al. U.S. Pat. No. 7,057,654, Bawolek et al. U.S. Pat. Nos. 6,771,314 B1 and 5,914,748, Vook et al. U.S. Pat. No. 6,771,314B1, Silverstein et al. U.S. Pat. No. 4,800,375, Merril et. al. U.S. Pat. No. 5,965,875, and Chang U.S. Patent Application Publication No. US2007/0145273 A1).

In any imaging system, diffraction sets a fundamental image resolution limit that depends only on the aperture's f-stop (or f-number) setting of the image sensor optics, and on the wavelength of light being imaged. The foregoing color filter arrays, which are based on luminance-chrominance considerations, do not address the wavelength-dependent diffraction effects that can occur with the image sensor optics.

Consideration is now being given to color filter arrays for color imaging when diffraction effects caused by image sensor optics may be significant.

SUMMARY

Systems, devices, and methods for modifying the information content of color images are provided.

An exemplary color imaging device includes an array of color responsive or sensitive elements having a number ($N_B$) of a first type of color responsive elements sensitive to a blue (B) spectral region, a number ($N_G$) of a second type of color responsive elements sensitive to a green (G) spectral region, and a number ($N_R$) of a third type of color responsive elements sensitive to a red (R) spectral region. Each color responsive element may include a photo sensor element and a transmissive color filter element. The numbers of the first, second and third types of color responsive elements may be ordered as $N_B>N_G$ and $N_B>N_R$.

Another exemplary color imaging device includes a focusing element having a focal length (F) coupled to an aperture having an effective diameter (D). The color imaging device further includes an array of color responsive or selective elements disposed at or about the focal length. The color responsive or selective elements correspond to a set of separate color channels (i), where i=1, 2, 3, n. Each color channel i is associated with a respective color wavelength $\lambda_i$. Further, a number ($N_1$) of color responsive elements corresponding to the color channel having a lowest wavelength $\lambda_1$ in the array is greater than about a number ($N_2$) of color responsive elements corresponding to the color channel having a higher wavelength $\lambda_2$ in the array. For example, the numbers ($N_i$) of color responsive elements corresponding to color channels i may be ordered so that $N_1>N_2\geqq \ldots \geqq Nn$. Further, for example, the numbers ($N_i$) of color responsive elements corresponding to color channels i may be ordered in about a same proportion as the squares of the Airy disk diameters 1.22*F/D $\lambda_i$ for light diffracted by the aperture at about the focal length.

An exemplary method for demosaicing or reconstructing raw image sensor data includes providing a two-dimensional array of light intensity pixel values of a scene sampled by an imaging device with an f-stop (f), wherein a first subarray of pixel values corresponds to sampled light intensity values $I_{sampled}(\lambda_1)$ associated with a first color wavelength $\lambda_1$, and a second non-over lapping subarray of pixel values corresponds to sampled light intensity values $I_{sampled}(\lambda_2)$ associated with a second color wavelength $\lambda_2$. The method may further include, for one or more pixels in the first sub array having sampled light intensity values $I_{sampled}(\lambda_1)$ estimating unsampled light intensity values $I_{estimated}(\lambda_2)$ corresponding to the second color wavelength $\lambda_2$, and for one or more pixels in the second sub array having sampled light intensity values $I_{sampled}(\lambda_2)$ estimating unsampled light intensity values $I_{estimated}(\lambda_1)$ corresponding to the first color wavelength $\lambda_1$. The method also includes modifying the sampled and/or estimated light intensity values in one or more of the pixels as a function of the Airy disk diameter 1.22*f*λ associated with light diffraction by the imaging device at wavelength λ, and outputting the modified array of pixels of sampled and/or estimated light intensity values as a partial or full color image representation or rendition of the scene.

An exemplary system for demosaicing or reconstructing raw image sensor data includes circuitry configured to receive a two-dimensional array of pixels having light intensity values of a scene sampled by an imaging device with an f-stop (f), wherein a first subarray of pixel values corresponds to sampled light intensity values Is ($\lambda_1$) associated with a first color wavelength $\lambda_1$, and a second non-over lapping subarray of pixel values corresponds to sampled light intensity values Is ($\lambda_2$) associated with a second color wavelength $\lambda_2$. The system also includes circuitry configured to estimate, for one or more pixels in the first and the second sub arrays having sampled light intensity values Is ($\lambda_1$) and Is ($\lambda_2$), respectively, unsampled light intensity values Ie ($\lambda_2$) and Ie ($\lambda_1$) corresponding to the corresponding to the second color wavelength $\lambda_2$ and the first color wavelength $\lambda_1$, respectively. The circuitry is further configured to modify the sampled and/or estimated light intensity values in one or more of the pixels as a function of an Airy disk diameter 1.22*f*λ associated with light diffraction by the imaging device at wavelength λ, and to output the modified array of pixels of sampled and/or estimated light intensity values as a full or partial color image representation or rendition of the scene.

BRIEF DESCRIPTION OF THE FIGURES

In the accompanying drawings:

FIG. 1 is a schematic illustration of a Bayer filter mosaic;

FIG. 2 is a schematic illustration of an exemplary pattern of red, green and blue filter elements for a color filter array or mosaic, in accordance with the principles of the solutions described herein;

FIGS. 3A-3H are schematic illustrations of exemplary 3-, 4-, and 5- color repeating pattern units for color filter arrays or mosaics, in accordance with the principles of the solutions described herein;

FIGS. 6 and 7 are flow diagrams illustrating exemplary color imaging methods, in accordance with the principles of the solutions described herein;

FIGS. 8 and 9 are flow diagrams illustrating exemplary methods 800 and 900 for processing raw light intensity data for color imaging of a scene, in accordance with the principles of the solutions described herein; and FIG. 10 is a schematic illustration of an exemplary system for demosaicing or reconstruction of diffraction-corrected or compensated images from raw image sensor/color filter array data, in accordance with the principles of the solutions described herein.

Throughout the figures, unless otherwise stated, the same reference numerals and characters are used to denote like features, elements, components, or portions of the illustrated embodiments.

DETAILED DESCRIPTION

Figure 4:
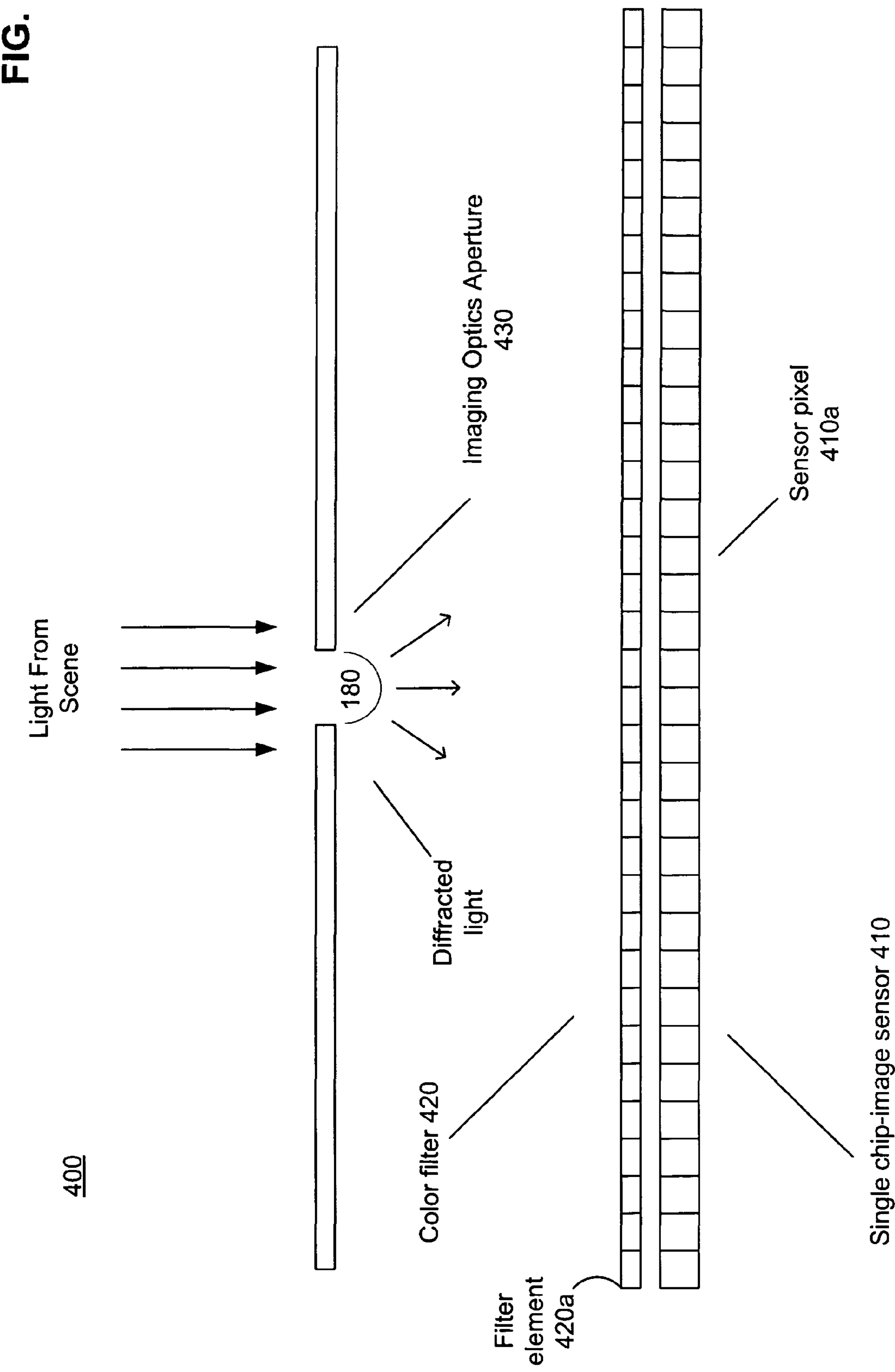
FIGS. 4 and 5 are schematic illustrations of exemplary imaging devices, in accordance with the principles of the solutions described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The terms "image" and "rendition of a scene" as used herein will be understood to include, without limitation, reference to image and scene rendition data and/or signals, respectively. The terms may also, in context, refer to display or output of such data and/or signals. Further, the term "extrapolate" data or values as used herein will be understood to include, without limitation, "interpolation" of data or values. More generally, any nominal term used herein to refer to a physical, mathematical, conceptual, perceptual, abstract object or aspect (e.g., spectral power distribution, spectral components of light, spectral response functions, etc.) will be understood to include, without limitation, reference to data and/or signals, or other tangible representations of the named object or aspect.

Conventional digital color sensors (e.g., in digital cameras, camcorders, and scanners) use a single detector array to capture images of scenes. A color filter (e.g., a Bayer CFA) is partially interleaved on the detector array. Each of the detector elements in the array corresponds to an image pixel, which measures the intensity of incoming light within a particular wavelength range—for example, red, green or blue. Various mosaics or patterns of color filters can be overlaid on the sensor array. The detector elements and/or the color filter elements coupled to them may be referred to as sensor elements, pixel sensors, or simply pixels. The intensity sample values sensed by them, after interpolation, may be referred to as image pixels.

Color mosaics or filter arrays (CFAs) and demosaicing techniques for digital imaging are disclosed herein. The disclosed CFAs and demosaicing techniques may be used in digital imaging to minimize, reduce, or compensate diffraction effects due to image sensor optics. It will be understood although color mosaicing and demosaicing techniques may be described herein with respect to specific examples of color sensors (e.g., to single-chip, color CCD camera), the CFAs and demosaicing techniques described herein are not restricted to any particular color sensor.

The CFA and demosaicing techniques described herein address the issue of diffraction effects in the image sensor optics. In image sensors, pixel size is related to image resolution. As digital technology and fabrication techniques advance, smaller and smaller pixel sizes for increasing image resolution are now practical. However, as pixel size decreases (or conversely, as pixel counts increase) diffraction effects can affect image resolution. A measure of the extent of diffraction is Airy disk. The Airy disk represents the 2-D diffraction pattern for an ideal circular aperture. The width or diameter of the Airy disk may be used to define a theoretical maximum resolution for an optical system. As the image sensor pixel size approaches an Airy disk size of the image sensor optics, a loss of resolution due to diffraction may be expected. (See e.g., web page: cambridgeincolour.com/tutorials/diffraction-photography).

When the diameter of the Airy disk's central peak becomes large relative to the pixel size in the image sensor, diffraction may have a visual impact on the image. Alternatively, if two Airy disks become any closer than half their widths they are also no longer resolvable (Rayleigh criterion). Diffraction thus sets a fundamental resolution limit that is independent of the number of megapixels, or the size of the film format of the image sensor. The resolution limit depends only on the aperture's f-stop (or f-number) and the wavelength of light being imaged.

The CFAs (and associated demosaicing techniques) herein reduce or compensate diffraction effects for achieving a given imaging sensor spatial resolution by weighing or biasing the distribution of color filter elements in a CFA toward wavelengths corresponding to smaller Airy disk sizes. For example, the Airy disk for a blue wavelength is substantially smaller than that for a red or green wavelength. Accordingly, the CFAs may, for example, be biased or weighted toward a blue wavelength in preference over green or red wavelengths. An exemplary red-green-blue CFA may have more blue pixels (e.g., 50%) than either red or green pixels (e.g., 25% each). The spatial resolution achievable using such an exemplary CFA may be set or determined by the smaller Airy disk dimensions at the blue wavelength rather than the larger Airy disks for the green and red wavelengths.

Image light intensity directed to a pixel may spill over or be smeared because of diffraction leading to loss of spatial resolution information. The loss of spatial resolution information due to diffraction may be reduced by weighing or biasing the distribution of color filter elements in a CFA toward smaller wavelengths, which diffract less than larger wavelengths.

An exemplary CFA with dominant blue wavelength pixels may also be used for increased or improved spatial resolution in black-and-white or monochrome imaging (e.g., in conjunction with a monochrome imaging sensor). In such an arrangement, the blue filtered pixels may set the achievable spatial resolution of the imaging sensor. The non-blue color pixels may provide additional scene/image information for construction of a suitable or appropriate black-and-white or monochrome.

The CFAs described herein may be designed with consideration of diffraction in the imaging sensor. The CFAs may be designed to sample more in the light band that gives the highest spatial resolution, and then worked backwards to estimate or improve luminosity resolution. Like wise, the demosaicing algorithms for reconstructing image sensor pixel data as an image of a scene may take into consideration diffraction in the imaging sensor, and "the color weighting" or distribution of colors in the CFA. The demosaicing algorithms may, for example, be based on consideration that green and red pixel data may be additionally smeared or filtered by diffraction processes over any smearing or filtering of blue pixel data.

FIG. 2 shows an exemplary RGB pattern 200 for a color filter array, which takes into account the increase in diffraction extent (e.g., Airy disk size) with increasing wavelength by weighing the number of color filter elements toward lower wavelengths (e.g., blue). The number of color filter elements at the lowest wavelength (e.g., blue) may be greater than the number of color filter elements at a higher wavelength (e.g., red or green). For example, the ratio of various color filter elements in RGB pattern CFA 200 may be: 50% blue, 25% green, and 25% red.

Similar design considerations to reduce or compensate diffraction effects may be used for CFAs based on other color combinations (e.g., RGBE, CYYM, CYGM, RGBW. etc.). For example, in the case of an RGBW combination, a CFA may have a suitable color weighted spatial pattern or distribution of R, G, B, W pixels. The W pixels may include or allow white light and/or invisible infrared light. The relative number of pixels for a particular color in the pattern or distribution may be in proportion to the size of the Airy disk at that color. An exemplary RGBW may have pixel numbers ordered as Blue>Green>Red>White.

An exemplary CFA may, in 1D, have pixel counts of B, G, and R in proportion to the ratio of the wavelengths. An exemplary CFA may, in 2D, have pixel counts of B, G, and R in proportion to the ratio of the squares of the wavelengths. For example, if the B, G and R pixels in the CFA correspond to 400, 550, and 700 nm wavelengths, respectively, then the ratio of pixels may be about 53.9% blue, 28.5% green, 17.6% red. For different center frequencies for the colors, the ratio of pixels may be adjusted accordingly. The B, G and R pixels may be distributed randomly or in repeating patterns.

Exemplary CFA patterns may include N×N repeat units. FIGS. 3A-3H show exemplary repeating units 300A-300H, respectively, corresponding to a 2×2 array with 2 B pixels, 1 R pixel, 1 G pixel; a 3×3 array with 5 B pixels, 2 R, and 2 G, a 3×3 array with 5 B pixels, 1 R pixel, and 3 G pixels; a 4×4 array with 8 B pixels, 3 R pixels, and 5 G pixels; a 5×5 array with 13 B pixels, 5 R pixels, and 7 G pixels; a 3×3 array with 4 B pixels, 1 R pixel, 2 G pixels, and 1 W pixel; a 4×4 array with 8 B pixels, 2 R pixels, 4 G pixels, and 2 W pixels; and a 5×5 array with 13 B pixels, 4 R pixels, 6 G pixel, and 2 W pixels, respectively.

Demosaicing algorithms for reconstructing images from pixel data when diffraction is present may be based on recognizing that for small enough pixels, diffraction gives a color-separated result. Each color is smeared to a different spatial size in proportion to the Airy disk. The demosaicing algorithms may exploit the fact that each color channel has a different degree of diffraction.

FIG. 4 shows an exemplary color imaging device 400. Device 400 may include a photo sensor (e.g., single-chip imaging sensor 410), a transmissive color filter array 420, and suitable imaging optics (e.g., aperture 430). Imaging sensor 410 includes a plurality of sensor units or pixels 410*a* that sense and/or record incident light intensity. Imaging sensor 410 is coupled to a transmissive color filter array 420. Each sensor unit or pixel 410*a* in imaging sensor 410 is coupled to a respective color element 420*a* of filter array 420. Color filter element 420*a* filters light incident on coupled sensor unit or pixel 410*a*. Each color filter array element 420*a* may allow light only within a respective spectral region (e.g., corresponding to a red, a blue or a green spectral region) to pass through to associated sensor unit or pixel 410*a*. Thus, each sensor unit or pixel 410*a* may sense or respond only to light intensity within a respective color spectral region.

For convenience in description, sensor units or pixels 410*a* and/or their respective color filter array elements 420*a* may be referred to herein individually or in paired combination as color selective or responsive elements. Thus, exemplary color imaging device 400 includes an array of color responsive elements 410*a*/420*a*. The array of color responsive elements may, for example, include a number ($N_B$) of a first type of color responsive elements sensitive to a blue (B) spectral region, a number ($N_G$) of a second type of color responsive elements sensitive to a green (G) spectral region, and a number ($N_R$) of a third type of color responsive elements sensitive to a red (R) spectral region.

An embodiment of color imaging device 400 addresses diffraction effects, for example, in the case where the imaging sensor optics is diffraction limited. In such a device 400, the numbers of the first, second and third types of color responsive elements are ordered as $N_B>N_G$ and $N_B>N_R$. The number of color responsive elements is weighted in favor of lower wavelengths (e.g., blue) to allow more resolution information of a scene to be sensed and/or recorded by imaging sensor 410 at wavelengths less susceptible to diffraction smearing.

In a version of device 400, $N_B/(N_B+N_G+N_R)$ is greater about ½. In another version of device 400, where the array of color responsive elements includes a two dimensional array of transmissive blue (B), green (G) and red (R) color filter pixels, the numbers of the blue (B), green (G), red (R) pixels are in a ratio of about 50% blue:25% green:and 25% red.

The array of color responsive elements (410*a*/420*a*) may include a two dimensional array of transmissive blue (B), green (G) and red (R) color filter pixels with an M×M repeat unit. The M×M repeat unit may, for example, include: a 2×2 array with 2 B pixels, 1 R pixel, and 1 G pixel; a 3×3 array with 5 B pixels, 2 R pixels, and 2 G pixels; a 3×3 array with 5 B pixels, 1 R pixels, and 3 G pixels; a 4×4 array with 8 B pixels, 3 R pixels, and 5 G pixels; and/or, a 5×5 array with 13 B pixels, 5 R pixels, and 7 G pixels.

In yet another version of device 400, the array of color responsive elements (410*a*/420*a*) may include a two dimensional array of transmissive blue (B), green (G), red (R) and white (W) color filter pixels. The numbers of the blue (B), green (G), red (R) pixels may be in a ratio of about 50% blue:25% green:and 25% red. Further, the numbers of the blue (B), green (G), red (R), and (W) pixels may be ordered as: Blue>Green, Blue>Red, and Blue>White. The two dimensional array of transmissive blue (B), green (G), red (R) and white (W) color filter pixels may include an M×M repeat unit. The M×M repeat unit may, for example, include: a 3×3 array with 4 B pixels, 1 R pixel, 2 G pixels, and 1 W pixel; a 4×4 array with 8 B pixels, 2 R pixels, 4 G pixels, and 2 W pixels; and/or, a 5×5 array with 13 B pixels, 4 R pixels, 6 G pixels, and 2 W pixels.

In terms of wavelength, the array of color responsive elements (410*a*/420*a*) in device 400 may be responsive or selective to blue, green and red spectral regions that are characterized by wavelengths $\lambda_B$, $\lambda_G$ and $\lambda_R$, respectively. The array of color responsive elements may include a two dimensional array of transmissive blue (B), green (G) and red (R) color filter pixels 420*a* in proportion to the squares of $\lambda_B$, $\lambda_G$ and $\lambda_R$, respectively. The array of color responsive elements may further include a number ($N_4$) of a fourth type of color responsive elements that are sensitive to a fourth spectral region characterized by a wavelength $\lambda_4$. In such case, the array of color responsive elements may include a two dimensional array of transmissive blue (B), green (G), red (R) and fourth color filter pixels in numbers that are in proportion to about squares of $\lambda_B$, $\lambda_G$, $\lambda_R$ and $\lambda_4$, respectively.

Although the first, second, third and fourth spectral regions are labeled or called hereto as blue, green, red and white regions, it will be understood that each region may be identified with or correspond to one or more other colors. For example, the blue, green and red spectral regions may correspond to cyan, yellow and magenta color spectral regions, respectively. The green spectral region may, for example, correspond to a green spectral region and an emerald spectral region, or to a green spectral region and a magenta spectral region. Additionally or alternatively, the blue spectral region may, for example, correspond to a violet spectral region.

Figure 5:
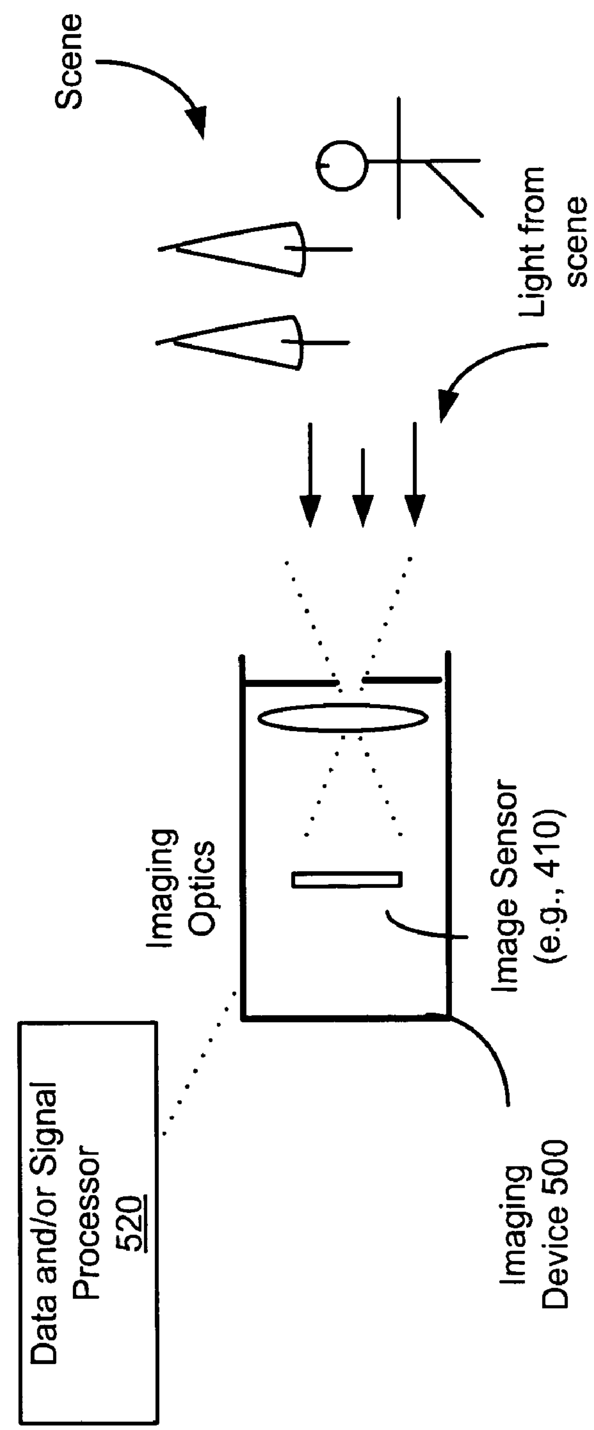

FIG. 5 shows an exemplary color imaging device 500. Imaging device 500 may include a focusing element having a focal length (F) coupled to an aperture having an effective diameter (D). An array of color responsive or sensitive elements (photo sensor elements 410$a$/transmissive color filter elements 420$a$) may be disposed in an imaging plane at about the focal length. The color responsive or sensitive elements may correspond one or more separate color channels (i) associated with one or more respective color wavelengths $\lambda_i$, where i=1, 2, 3, . . . n. A number of color responsive elements in the array corresponding to the color channel having a lowest wavelength $\lambda_1$ may greater than about a number ($N_2$) of color responsive elements corresponding to the color channel having a higher wavelength $\lambda_2$ in the array.

In an embodiment of device 500, the numbers ($N_i$) of color responsive elements may be ordered so that $N_1>N_2$, $N_1>N_3$, etc. For example, the numbers $N_i$ of color responsive elements may be ordered so that $N_1>N_2\geqq \ldots \geqq Nn$. Further, for example, the numbers $N_i$ of color responsive elements corresponding to color channels i may be ordered to be in about same proportion as the squares of the Airy disk diameters 1.22*F/D λi at about the focal length F for light diffracted by the circular aperture having a diameter D.

In device 500, the color channel having the lowest wavelength $\lambda_1$ may correspond to blue spectral region, a violet spectral region, or a cyan spectral region. The color channels having a wavelength higher than $\lambda_1$ may correspond to one or more of yellow, green, emerald, magenta, red, and white spectral regions.

In an exemplary device 500, the color channels i, i=1, 2 and 3, may correspond to blue (B), green (G) and red (R) spectral regions, respectively. Further, the corresponding number $N_1$, $N_2$, and $N_3$ of color responsive elements in the color channels i, i=1, 2 and 3 may be ordered as $N_1>N_2$, and $N_1>N_3$. In exemplary device 500, $N_1/(N_1+N_2+N_3)$ may be greater than about ½.

The array of color responsive or selective elements in exemplary device 500 may, for example, include a two dimensional array of transmissive blue (B), green (G) and red (R) color filter pixels with the numbers of the blue (B), green (G), red (R) pixels in a ratio of about 50% blue:25% green:and 25% red. The array of color responsive or selective elements may include a two dimensional array of transmissive color filter pixels with an M×M repeat unit. The M×M repeat unit may, for example, be: a 2×2 array with 2 B pixels, 1 R pixel, and 1 G pixel; a 3×3 array with 5 B pixels, 2 R pixels, and 2 G pixels; a 3×3 array with 5 B pixels, 1 R pixels, and 3 G pixels; a 4×4 array with 8 B pixels, 3 R pixels, and 5 G pixels; and/or a 5×5 array with 13 B pixels, 5 R pixels, and 7 G pixels.

Alternatively or additionally, the array of color responsive or selective elements in exemplary device 500 may, for example, include a two dimensional array of transmissive blue (B), green (G), red (R) and white (W) color filter pixels with the numbers of the blue (B), green (G), red (R) pixels in a ratio of about 2 blue:2 green:and 1 red. The numbers of the blue (B), green (G), red (R), and (W) pixels may be ordered as: Blue>Green, Blue>Red, Blue>White. For example, the numbers of the blue (B), green (G), red (R), and (W) pixels may be ordered as Blue>Green≧Red≧White.

Further, the array of color responsive elements may include a two dimensional array of transmissive blue (B), green (G), red (R) and white (W) color filter pixels with an M×M repeat unit. The M×M repeat unit may for example, be: a 3×3 array with 4 B pixels, 1 R pixel, 2 G pixels, and 1 W pixel; a 4×4 array with 8 B pixels, 2 R pixels, 4 G pixels, and 2 W pixels; and/or a 5×5 array with 12 B pixels, 4 R pixels, 6 G pixels, and 2 W pixels.

With further reference to FIG. 5, imaging devices 400 and 500 may further include or be otherwise coupled to a data or signal processor 500, which includes suitable data processing routines for demosaicing or reconstruction a color image of a scene from pixel intensity data sensed or recorded by devices 400 and/or 500.

Figure 7:
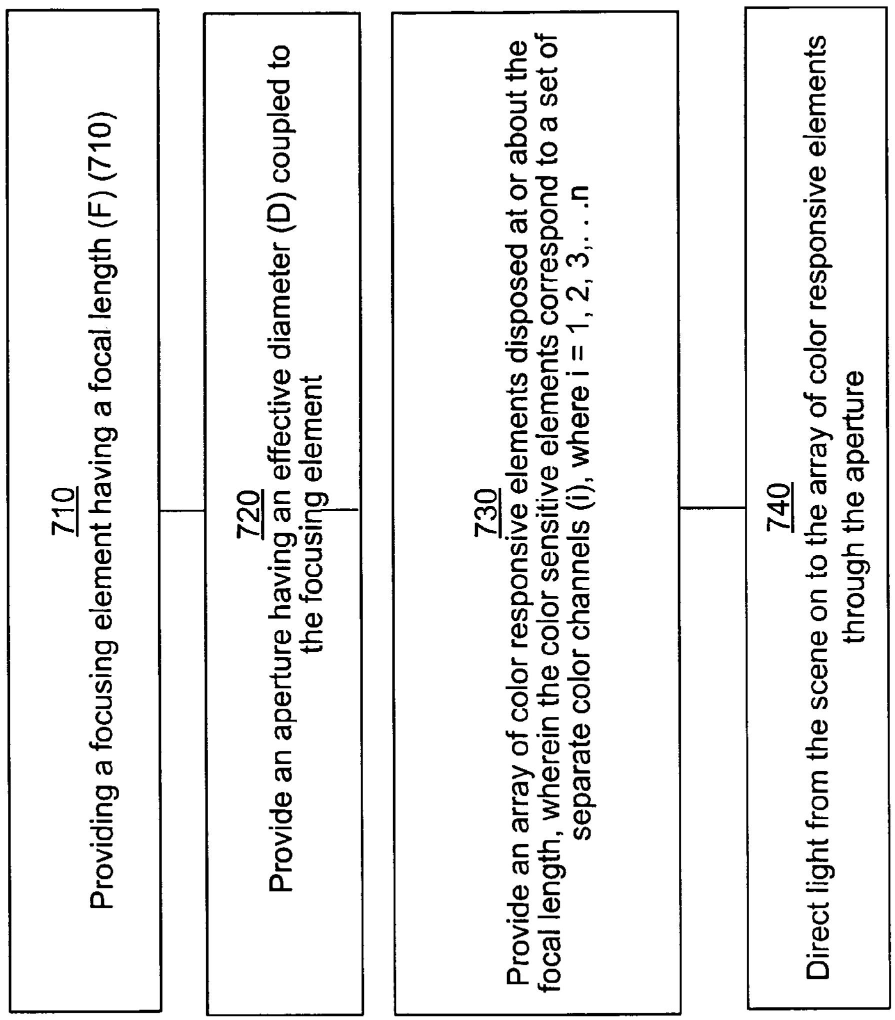

FIGS. 6 and 7 show exemplary color imaging methods 600 and 700 respectively. Method 600 includes providing an array of color responsive elements (610), and directing light from a scene on to the array color responsive elements (620). Providing an array of color responsive elements may include providing an array of color responsive elements (e.g., photo sensors 410$a$ coupled to an array of transmissive color filter elements 420$a$) having a number ($N_B$) of a first type of color responsive elements sensitive to a blue (B) spectral region, a number ($N_G$) of a second type of color responsive elements sensitive to a green (G) spectral region, and a number ($N_R$) of a third type of color responsive elements sensitive to a red (R) spectral region. The numbers of the first, second and third types of color responsive elements may be ordered as $N_B>N_G$ and $N_B>N_R$. The numbers of the first, second and third types of color responsive elements may, for example, be ordered as $N_B>N_G\geqq N_R$.

Method 700 for imaging a scene may include: providing a focusing element having a focal length (F) (710), and providing an aperture coupled to the focusing element, the aperture having an effective diameter (D) (720). Method 700 may further include providing an array of color responsive or sensitive elements disposed at or about the focal length (730). The color responsive or sensitive elements may correspond to a set of separate color channels (i), where i=1, 2, 3 . . . n. The focusing element having the focal length F may be configured to direct light from the scene on to the array of color responsive elements through the aperture (740).

In method 700, each color channel i may be associated with a respective color wavelength $\lambda_i$. A number ($N_1$) of color responsive elements corresponding to the color channel having a lowest wavelength $\lambda_1$ in the array may be greater than about a number ($N_2$) of color responsive elements corresponding to the color channel having a higher wavelength $\lambda_2$ in the array, and the numbers $N_i$ of color responsive elements corresponding to color channels i may be ordered so that $N_1>N_2$, $N_1>N_3 \ldots N_1>N_n$. The numbers $N_i$ of color responsive elements corresponding to color channels i may, for example, be ordered so that $N_1>N_2\geqq \ldots \geqq N_n$. Further, for example, the numbers $N_i$ of color responsive elements corresponding to color channels i may be ordered to be in about the same proportion as the squares of the Airy disk diameters 1.22*F/D $\lambda_i$ at about the focal length for light having wavelengths $\lambda_i$ diffracted by the aperture.

Figure 8:
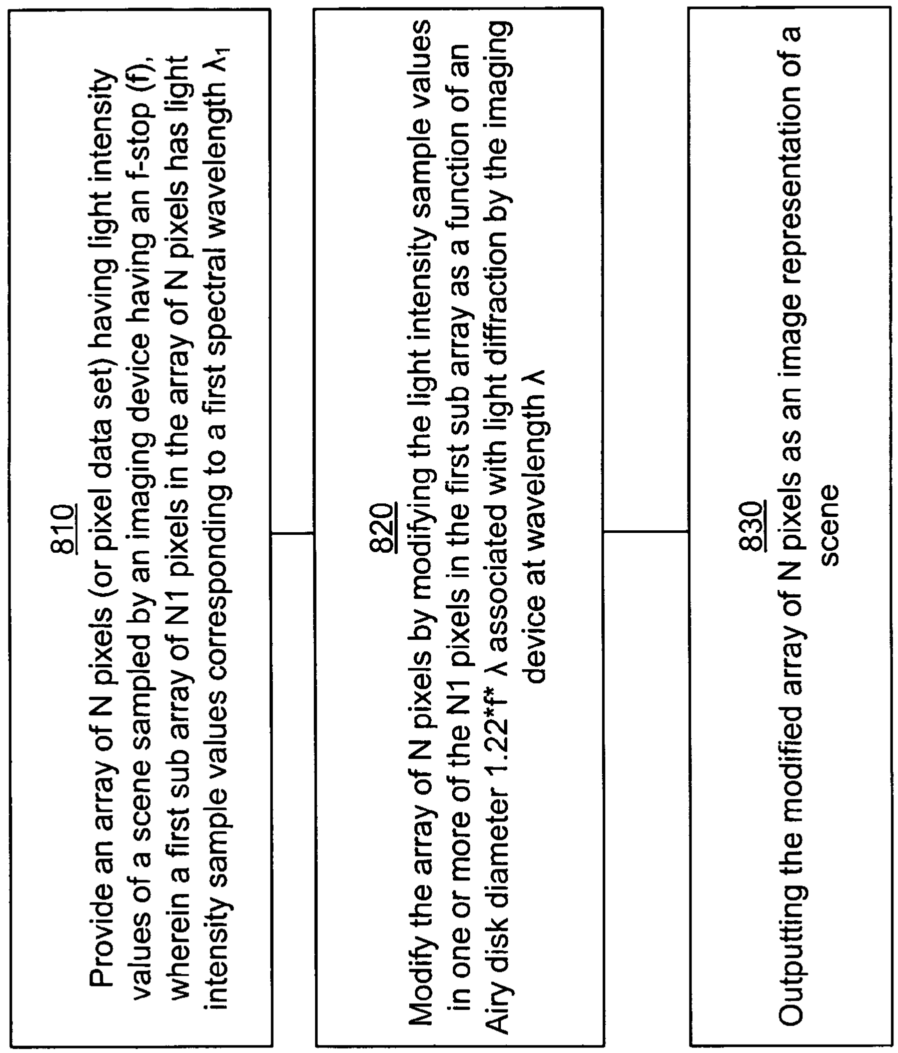

FIGS. 8 and 9 show further exemplary methods 800 and 900 for processing light intensity data for imaging a scene. Methods 800 and 900 may be implemented for example, using data or signal processor 500 (FIG. 5) or other processing device coupled to a camera or digital image sensor (e.g., devices 400 or 500). It will be understood that the camera or digital image sensor may be a device having a conventional color filter array (e.g., a Bayer color filter array) or any other color filter array (e.g., CFAs 100, 200, and 300$a$-300$h$ described herein). Method 800 relies on correcting or de-smearing diffraction-smeared data pixels.

With reference to FIG. 8, method 800 includes providing an array of N pixels having light intensity values of a scene sampled by an imaging device having an f-stop (f) (810). A first sub array of N1 pixels in the array of N pixels may have light intensity sample values corresponding to a first spectral wavelength $\lambda_1$. Method 800 further includes modifying the array of N pixels by modifying the light intensity sample values in one or more of the N1 pixels in the first sub array as a function of an Airy disk diameter 1.22*f*λ associated with light diffraction by the imaging device at wavelength λ (820), and outputting the modified array of N pixels as an image representation of a scene (830). Modifying the light intensity sample values 820 may, for example, include, scaling light intensity sample values in proportion to the Airy disk diameter 1.22*f*λ (e.g., the Airy disk diameter 1.22*f*$\lambda_1$).

Providing an array of N pixels having light intensity values of a scene sampled by an imaging device 810 may, in addition to providing a first sub array of N1 pixels, include providing a second sub array of N2 pixels having light intensity sample values corresponding to a second spectral wavelength $\lambda_2$. Further, modifying the light intensity sample values in one or more of the N1 pixels in the first sub array may, for example, include modifying light intensity sample values in proportion to the Airy disk diameter 1.22*f*$\lambda_2$ associated with light diffraction by the imaging device at the second spectral wavelength $\lambda_2$, and/or a function of a pixel dimension and the Airy disk diameter 1.22*f*$\lambda_2$.

Method 800 may also include estimating light intensity values corresponding to the second spectral wavelength $\lambda_2$ in one or more of the N1 pixels in the first sub array, and/or further modifying the estimated light intensity values corresponding to the second spectral wavelength $\lambda_2$ in one or more of the N1 pixels in the first sub array as a function of the Airy disk diameter 1.22*f*λ associated with light diffraction by the imaging device at wavelength λ and/or a function of a pixel dimension and the Airy disk diameter 1.22*f*λ. Such modification may, for example, may correct for light intensity that may have spread or spilled over pixel boundaries because of diffraction. In the case of an isolated pixel (e.g., an isolated red pixel) such modification may for example, increase the sampled intensity value to account for light intensity that may have spread or spilled over pixel boundaries because of diffraction as a function of the pixel size and the Airy disk diameter for red wavelength.

Estimating light intensity values corresponding to the second spectral wavelength $\lambda_2$ in one or more of the N1 pixels in the first sub array may include deploying one or more of multivariate interpolation, nearest-neighbor interpolation, bilinear interpolation, bicubic interpolation, spline interpolation, Lanczos resampling, and/or spatial and/or spectral correlation of pixel values.

Additionally or alternatively, estimating light intensity values corresponding to the second spectral wavelength $\lambda_2$ in one or more of the N1 pixels in the first sub array may include extrapolating (or interpolating) pixel values, for example, in a frequency domain.

In method 800, extrapolating (or interpolating) light intensity sample values corresponding to the second spectral wavelength $\lambda_2$ may be based on light intensity sample values corresponding to the first spectral wavelength $\lambda_1$. Conversely, method 800 may additionally or alternatively involve extrapolating (or interpolating) light intensity sample values corresponding to the first spectral wavelength $\lambda_1$ based on light intensity sample values corresponding to the second spectral wavelength $\lambda_2$.

Method 800 may include estimating light intensity values corresponding to further wavelengths (e.g., a third spectral wavelength $\lambda_3$) in one or more of the N1 pixels in the first sub array.

With reference to FIG. 9, method 900 includes: providing a two-dimensional array of light intensity pixel values of a scene sampled by an imaging device with an f-stop (f) (910). The two-dimensional array may include a first subarray of pixel values corresponds to sampled light intensity values $I_{sampled}$ ($\lambda_1$) associated with a first color wavelength and a second non-over lapping subarray of pixel values corresponds to sampled light intensity values $I_{sampled}$ ($\lambda_2$) associated with a second color wavelength $\lambda_2$. Method 900 further includes: for one or more pixels in the first and the second sub arrays having sampled light intensity values $I_{sampled}$ ($\lambda_1$) and $I_{sampled}$ ($\lambda_2$), respectively, estimating unsampled light intensity values $I_{estimated}$ ($\lambda_2$) and $I_{estimated}$ ($\lambda_1$) corresponding to the second color wavelength $\lambda_2$ and the first color wavelength $\lambda_1$, respectively (920). Method 900 also includes modifying the array of N pixels by modifying the sampled and/or estimated light intensity values in one or more of the pixels as a function of the Airy disk diameter 1.22*f*λ associated with light diffraction by the imaging device at wavelength λ (930). Modifying the sampled and/or estimated light intensity values in one or more of the pixels as a function of the Airy disk diameter 1.22*f*λ and the pixel dimension may, for example, correct for light intensity that may have spilled over or spread over a pixel boundary because of diffraction in the imaging sensor optics.

When $\lambda_1$ is less than $\lambda_2$, method 900 may involve modifying the sampled and/or estimated light intensity values in one or more of the pixels as a function of a pixel dimension and the Airy disk diameter 1.22*f*$\lambda_2$ corresponding to light diffraction by the imaging device at the larger wavelength $\lambda_2$.

Like in method 800, in method 900, modifying and/or estimating unsampled light intensity values for one or more pixels may involve deploying one or more of multivariate interpolation, nearest-neighbor interpolation, bilinear interpolation, bicubic interpolation, spline interpolation, Lanczos resampling, and/or spatial and/or spectral correlation of pixel values.

Additionally or alternatively, modifying the sampled and/or estimated light intensity values in one or more of the pixels may include extrapolating (or interpolating) pixel values, for example, in a frequency domain. The extrapolation (or interpolation) may be based on light intensity sample values corresponding to the first spectral wavelength $\lambda_1$ and/or the second spectral wavelength $\lambda_2$. Additionally or alternatively, modifying and/or estimating light intensity values may include extrapolating (or interpolating) pixel values, for example, in a frequency domain. Further, estimating light intensity values corresponding to the second spectral wavelength $\lambda_2$ for one or more pixels may be based on light intensity sample values corresponding to the first spectral wavelength $\lambda_1$ and vice versa.

Method 900 may further include, for one or more pixels in the first and the second sub arrays having sampled light intensity values Is ($\lambda_1$) and Is ($\lambda_2$), respectively, estimating unsampled light intensity values corresponding to a third spectral wavelength $\lambda_3$.

Method 900 further includes and outputting the modified array of pixels of sampled and/or estimated light intensity values as a demosaiced or reconstructed image representation or rendition of the scene (940).

The various wavelengths (e.g., $\lambda_1$, $\lambda_2$, and $\lambda_3$) referred to in the foregoing) description of methods 800 and 900 may correspond to specific spectral regions (e.g., spectral regions associated with color filter arrays in the imaging device). For example, the first spectral wavelength $\lambda_1$ may correspond to a wavelength in a blue, a green, or a red color spectral band.

Methods for demosaicing or reconstructing color images from image sensor pixel data with compensation or correction of diffraction effects (e.g., methods 800 and 900) may be implemented using any suitable data and/or or signal processing arrangements. FIG. 10 show the components of an exemplary system 1000 for demosaicing or reconstruction of images from image sensor/color filter array data System 1000 includes circuitry 1010, circuitry 1020, circuitry 1030 and circuitry 1040, which may be suitably configured to process image sensor pixel data sequentially, iteratively, or in parallel.

Circuitry 1010 may be configured to receive raw image data, for example, a two-dimensional array of pixels having light intensity values of a scene sampled by an imaging device having an f-stop (f). The array of pixels may include a first subarray of pixel values corresponds to sampled light intensity values Is ($\lambda_1$) associated with a first color wavelength $\lambda_1$, and a second non-over lapping subarray of pixel values corresponds to sampled light intensity values Is ($\lambda_2$) associated with a second color wavelength $\lambda_2$. The first spectral wavelength $\lambda_1$ may, for example, correspond to a wavelength in a blue, a green, or a red color spectral band. The second spectral wavelength $\lambda_1$ may correspond to another color spectral band.

Circuitry 1020 may be configured to estimate unsampled light intensity values Ie ($\lambda_2$) corresponding to the second color wavelength $\lambda_2$ and Ie ($\lambda_1$) corresponding to the first color wavelength $\lambda_1$ for one or more pixels in the first and the second sub arrays having sampled light intensity values Is ($\lambda_1$) and Is ($\lambda_2$), respectively. Circuitry 1020 may include circuitry configured to apply one or more of multivariate interpolation, nearest-neighbor interpolation, bilinear interpolation, bicubic interpolation, spline interpolation, and/or Lanczos resampling, and/or to apply spatial and/or spectral correlation of pixel values. Additionally or alternatively, circuitry 1020 may include circuitry configured to extrapolate (or interpolate) pixel values, for example, in a frequency domain. The circuitry configured to extrapolate (or interpolate) pixel values may be configured to extrapolate (or interpolate) light intensity sample values corresponding the second spectral wavelength $\lambda_2$ based on light intensity sample values corresponding to the first spectral wavelength $\lambda_1$ and/or vice versa. Alternatively or additionally, the circuitry configured to estimate unsampled light intensity values for one or more pixels may include circuitry configured to estimate unsampled light intensity values corresponding to a third spectral wavelength $\lambda_3$ for one or more pixels in the first and the second sub arrays having sampled light intensity values Is ($\lambda_1$) and Is ($\lambda_2$), respectively.

Circuitry 1030 may be configured to modify the array of N pixels by modifying the sampled and/or estimated light intensity values (e.g., Is ($\lambda_1$), Is ($\lambda_2$), Ie ($\lambda_1$), and/or Ie ($\lambda_2$)) in one or more of the pixels as a function of an Airy disk diameter 1.22*f*$\lambda$, associated with light diffraction in the imaging device at wavelength $\lambda$.

Circuitry 1030 configured to modify the array of N pixels by modifying the sampled and/or estimated light intensity values may include circuitry configured to modify the sampled and/or estimated light intensity values in one or more of the pixels as a function of a ratio of a pixel dimension and the Airy disk diameter 1.22*f*$\lambda$ corresponding to light diffraction by the imaging device at wavelength $\lambda$. For the case where $\lambda_1$ is less than $\lambda_2$, the circuitry may be configured to modify the sampled and/or estimated light intensity values in one or more of the pixels as a function of a ratio of a pixel dimension and the Airy disk diameter 1.22*f*$\lambda_2$ corresponding to light diffraction by the imaging device at wavelength $\lambda_2$.

Lastly, circuitry 1040 may be configured to output the modified array of pixels of sampled and/or estimated light intensity values as a partial or full color image representation or rendition of the scene to a display or a further processor.

The various wavelengths (e.g., $\lambda_1$, $\lambda_2$, and $\lambda_3$) referred to in the foregoing description of system 1000 may correspond to specific spectral regions (e.g., spectral regions associated with color filter arrays in the imaging device). For example, the first spectral wavelength $\lambda_1$ may correspond to a wavelength in a blue, a green, or a red color spectral band.

It will be understood that the descriptions of various aspects and embodiments of the subject matter disclosed herein are for purposes of illustration only, and are not intended to be limiting the true scope and spirit of this disclosure.

It also will be understood that the subject matter disclosed herein can be implemented using any suitable combination of hardware and software. The software (i.e., instructions) for implementing and operating the aforementioned imaging systems and associated demosaicing techniques can be provided on computer-readable media, which can include without limitation, firmware, memory, storage devices, micro controllers, microprocessors, integrated circuits, ASICS, online downloadable media, and other available media.

The invention claimed is:

1. A method, comprising:

providing an array of N pixels having light intensity values of a scene sampled by an imaging device having an f-stop (f), wherein a first sub array of N1 pixels in the array of N pixels has light intensity sample values corresponding to a first spectral wavelength λ1;

modifying the array of N pixels by modifying the light intensity sample values in one or more of the N1 pixels in the first sub array as a function of an Airy disk diameter 1.22*f* λ associated with light diffraction by the imaging device at wavelength λ; and outputting the modified array of N pixels as an image representation of the scene.

2. The method of claim 1, wherein modifying the array of N pixels comprises modifying the light intensity sample values in one or more of the N1 pixels in the first sub array as a function of the Airy disk diameter 1.22*f* λ1 associated with light diffraction by the imaging device at wavelength λl.

3. The method of claim 1, wherein modifying the light intensity sample values in one or more of the N1 pixels in the first sub array as a function of a ratio of a pixel dimension and the Airy disk diameter 1.22*f* λl.

4. The method of claim 1, wherein providing an array of N pixels further comprises providing an array of N pixels with a second sub array of N2 pixels having light intensity sample values corresponding to a second spectral wavelength λ2.

5. The method of claim 4, wherein modifying the array of N pixels comprises modifying the light intensity sample values in one or more of the N1 pixels in the first sub array as a function of the Airy disk diameter 1.22*f* λ2 associated with light diffraction by the imaging device at wavelength λ2.

6. The method of claim 4, further comprising, estimating light intensity values corresponding to the second spectral wavelength λ2 in one or more of the N1 pixels in the first sub array.

7. The method of claim 6, further comprising, modifying the estimated light intensity values corresponding to the second spectral wavelength λ2 in one or more of the N1 pixels in the first sub array as a function of the Airy disk diameter 1.22*f* λ associated with light diffraction by the imaging device at wavelength λ.

8. The method of claim 7, wherein modifying the estimated light intensity values corresponding to the second spectral wavelength λ2 in one or more of the N1 pixels in the first sub array comprises modifying the estimated light intensity values as a function of a pixel dimension and the Airy disk diameter 1.22*f* λ corresponding to light diffraction by the imaging device at wavelength λ.

9. The method of claim 6, wherein estimating light intensity values corresponding to the second spectral wavelength λ2 in one or more of the N1 pixels in the first sub array comprises deploying one or more of multivariate interpolation, nearest-neighbor interpolation, bilinear interpolation, bicubic interpolation, spline interpolation, and/or Lanczos resampling.

10. The method of claim 6, wherein estimating light intensity values corresponding to the second spectral wavelength λ2 in one or more of the N1 pixels in the first sub array comprises spatial and/or spectral correlation of pixel values.

11. The method of claim 6, wherein estimating light intensity values corresponding to the second spectral wavelength λ2 in one or more of the N1 pixels comprises extrapolating pixel values in a frequency domain.

12. The method of claim 6, wherein estimating light intensity values corresponding to the second spectral wavelength λ2 in one or more of the N1 pixels comprises extrapolating light intensity sample values corresponding the second spectral wavelength λ2 based on light intensity sample values corresponding to the first spectral wavelength λ1.

13. The method of claim 6, further comprising, estimating light intensity values corresponding to a third spectral wavelength λ3 in one or more of the N1 pixels in the first sub array.

14. The method of claim 1, wherein the first spectral wavelength λ1 corresponds to a wavelength in a blue, a green, or a red color spectral band.

15. A method, comprising:

providing a two-dimensional array of pixels of light intensity values of a scene sampled by an imaging device with an f-stop (f), wherein a first subarray of pixels corresponds to sampled light intensity values Isampled (λ1) associated with a first color wavelength λl, and a second non-over lapping subarray of pixels corresponds to sampled light intensity values Isampled (λ2) associated with a second color wavelength λ2;

for one or more pixels in the first and the second subarrays having sampled light intensity values Isampled (λ1) and Isampled (λ2), respectively, estimating unsampled light intensity values Iestimated (λ2) corresponding to the second color wavelength λ2 and Iestimated (λ1) corresponding to the first color wavelength λl, respectively;

modifying the array of pixels by modifying one or more of the sampled and/or estimated light intensity values (Isampled (λ1), Iestimated (λ2), Iestimated (λ1), Isampled (λ2)) as a function of the Airy disk diameter 1.22*f* λ associated with light diffraction by the imaging device at wavelength λ; and outputting the modified array of pixels of sampled and/or estimated light intensity values as a full or partial color image representation of the scene.

16. The method of claim 15, further comprising, modifying the sampled and/or estimated light intensity values in one or more of the pixels as a function of a ratio of a pixel dimension and the Airy disk diameter 1.22*f* λ corresponding to light diffraction by the imaging device at wavelength λ.

17. The method of claim 15, wherein λ1 is less than λ2, the method further comprising modifying the sampled and/or estimated light intensity values in one or more of the pixels as a function of a ratio of a pixel dimension and the Airy disk diameter 1.22*f* λ2 corresponding to light diffraction by the imaging device at wavelength λ2.

18. The method of claim 15, wherein estimating unsampled light intensity values for one or more pixels comprises deploying one or more of multivariate interpolation, nearest-neighbor interpolation, bilinear interpolation, bicubic interpolation, spline interpolation, and/or Lanczos resampling.

19. The method of claim 15, wherein estimating unsampled light intensity values for one or more pixels comprises spatial and/or spectral correlation of pixel values.

20. The method of claim 15, wherein estimating unsampled light intensity values for one or more pixels comprises extrapolating pixel values in the frequency domain.

21. The method of claim 15, wherein estimating light intensity values corresponding to the second spectral wavelength λ2 for one or more pixels comprises extrapolating light intensity sample values corresponding the second spectral wavelength λ2 based on light intensity sample values corresponding to the first spectral wavelength λl.

22. The method of claim 15, further comprising, for one or more pixels in the first and the second sub arrays having sampled light intensity values Is (λ1) and Is (λ2), respectively, estimating unsampled light intensity values corresponding to a third spectral wavelength λ3.

23. The method of claim 15, wherein the first spectral wavelength λl corresponds to a wavelength in a blue, a green, or a red color spectral band.

24. A system, comprising:

circuitry configured to receive a two-dimensional array of pixels having light intensity values of a scene sampled by an imaging device with an f-stop (f), wherein a first subarray of pixels corresponds to sampled light intensity values Is (λ1) associated with a first color wavelength λl, and a second non-overlapping subarray of pixels corresponds to sampled light intensity values Is (λ2) associated with a second color wavelength λ2;

circuitry configured to estimate unsampled light intensity values Ie (λ2) corresponding to the second color wavelength λ2 and/or Ie (λ1) corresponding to the first color wavelength λ1 for one or more pixels in the first and the second sub arrays having sampled light intensity values Is (λ1) and Is (λ2), respectively;

circuitry configured to modify the array of N pixels by modifying the sampled and/or estimated light intensity values in one or more of the pixels as a function of an Airy disk diameter 1.22*f* λ associated with light diffraction by the imaging device at wavelength λ; and circuitry configured to output the modified array of pixels of sampled and/or estimated light intensity values as a partial or full color image representation of the scene to a display or a further processor.

25. The system of claim 24, wherein the circuitry configured to modify the array of N pixels comprises circuitry configured to modify the sampled and/or estimated light intensity values in one or more of the pixels as a function of a ratio of a pixel dimension and the Airy disk diameter1.22*f* λ corresponding to light diffraction by the imaging device at wavelength λ.

26. The system of claim 24, wherein λl is less than λ2, and wherein the circuitry configured to modify the array of N pixels comprises circuitry configured to modify the sampled and/or estimated light intensity values in one or more of the pixels as a function of a ratio of a pixel dimension and the Airy disk diameter 1.22*f* λ2 corresponding to light diffraction by the imaging device at wavelength λ2.

27. The system of claim 24, wherein the circuitry configured to estimate unsampled light intensity values for one or more pixels comprises circuitry configured to apply one or more of multivariate interpolation, nearest-neighbor interpolation, bilinear interpolation, bicubic interpolation, spline interpolation, and/or Lanczos resampling.

28. The system of claim 24, wherein the circuitry configured to estimate unsampled light intensity values for one or more pixels comprises circuitry configured to apply spatial and/or spectral correlation of pixel values.

29. The system of claim 24, wherein the circuitry configured to estimate unsampled light intensity values for one or more pixels comprises circuitry configured to extrapolate pixel values in a frequency domain.

30. The system of claim 24, wherein the circuitry configured to estimate unsampled light intensity values for one or more pixels comprises circuitry configured to extrapolate light intensity sample values corresponding the second spectral wavelength $\lambda\mathbf{2}$ based on light intensity sample values corresponding to the first spectral wavelength $\lambda\mathbf{1}$.

31. The system of claim 24, further comprising circuitry configured to estimate unsampled light intensity values corresponding to a third spectral wavelength $\lambda\mathbf{3}$ for one or more pixels in the first and the second sub arrays having sampled light intensity values Is ($\lambda\mathbf{1}$) and Is ($\lambda\mathbf{2}$), respectively.

32. The system of claim 24, wherein the first spectral wavelength $\lambda\mathbf{1}$ corresponds to a wavelength in a blue, a green, or a red color spectral band.

* * * * *